No. 609,674. Patented Aug. 23, 1898.
A. G. HITCHCOCK.
BALL BEARING.
(Application filed Sept. 15, 1897.)
(No Model.) 2 Sheets—Sheet 1.

WITNESSES:

INVENTOR
A. G. Hitchcock.
BY
ATTORNEYS.

THE NORRIS PETERS CO., PHOTO-LITHO., WASHINGTON, D. C.

No. 609,674. Patented Aug. 23, 1898.
A. G. HITCHCOCK.
BALL BEARING.
(Application filed Sept. 15, 1897.)
(No Model.) 2 Sheets—Sheet 2.
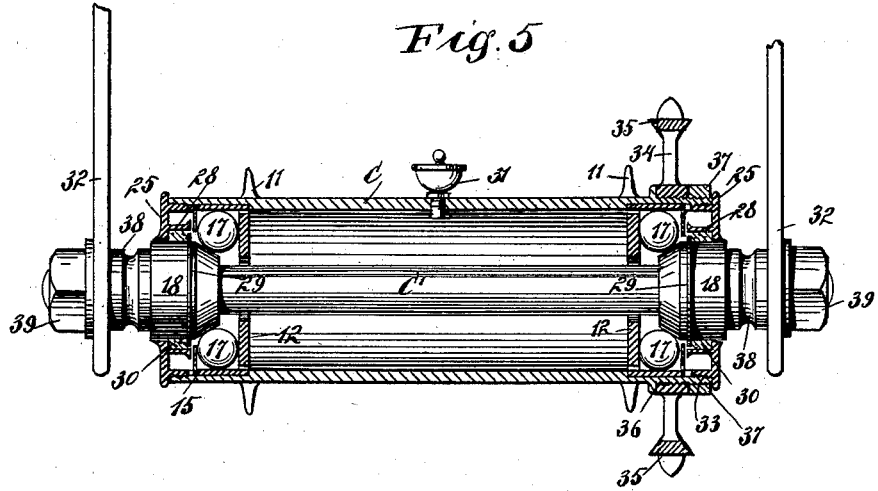
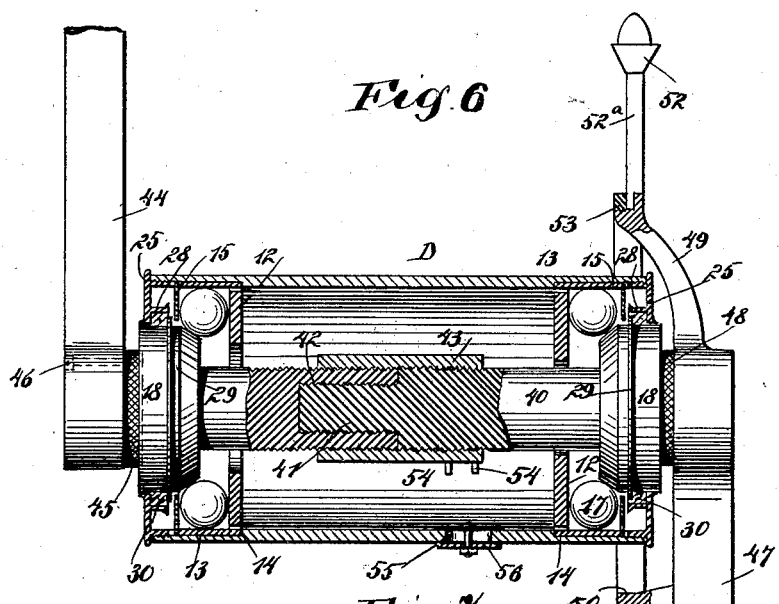
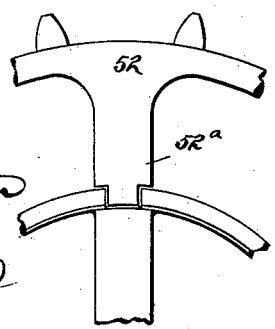
WITNESSES:
INVENTOR
A. G. Hitchcock
BY
ATTORNEYS.
THE NORRIS PETERS CO., PHOTO-LITHO., WASHINGTON, D. C.

UNITED STATES PATENT OFFICE.

ARTHUR GORDON HITCHCOCK, OF HONOLULU, HAWAII.

BALL-BEARING.

SPECIFICATION forming part of Letters Patent No. 609,674, dated August 23, 1898.

Application filed September 15, 1897. Serial No. 651,749. (No model.)

*To all whom it may concern:*

Be it known that I, ARTHUR GORDON HITCHCOCK, of Honolulu, Hawaiian Islands, have invented a new and Improved Ball-Bearing, of which the following is a full, clear, and exact description.

The object of my invention is to provide a ball-bearing for the hubs of wheels, especially bicycle-wheels, and likewise a ball-bearing for crank-hangers in bicycles, the bearings being of simple, durable, and economic construction and so arranged that the bearing will run true, access being readily obtained to any portion of the bearing, and whereby the bearing will at all times be kept properly lubricated and will be rendered dust-proof and capable of retaining lubricating material.

The invention will be fully described hereinafter and defined in the claims.

My invention being applicable both to "crank-hangers" and "wheel-hubs," in the claims I have not limited myself to these terms, but employ the broad expression "casing" as covering a hub, a crank-hanger, or the equivalent thereof.

Reference is to be had to the accompanying drawings, forming a part of this specification, in which similar characters of reference indicate corresponding parts in all the figures.

Figure 1:
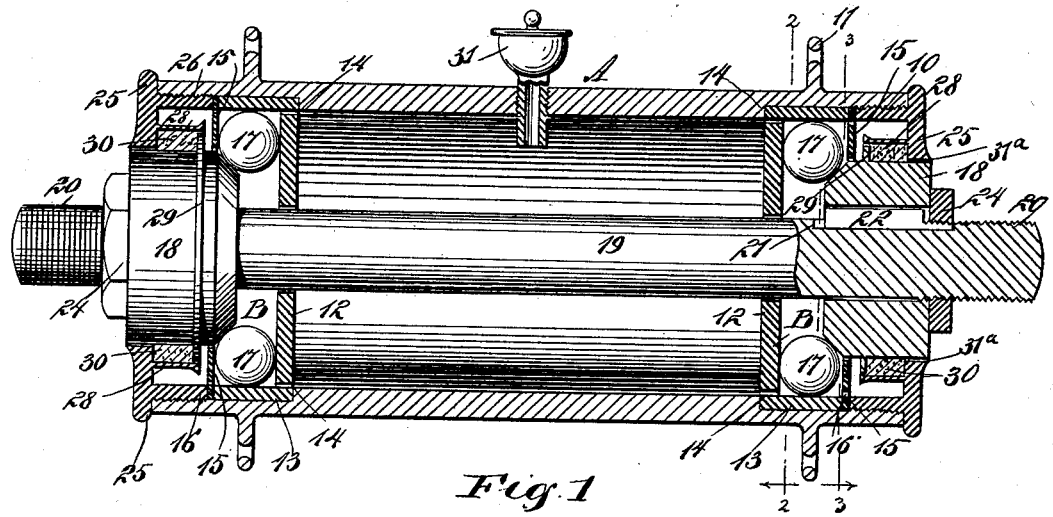
Figure 2:
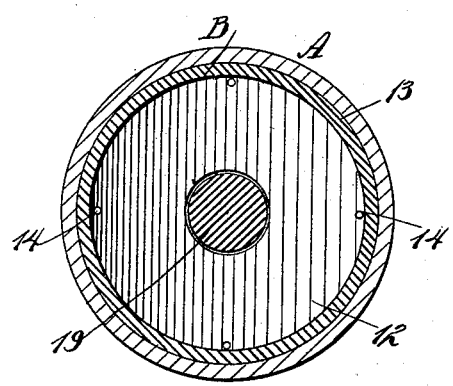
Figure 3:
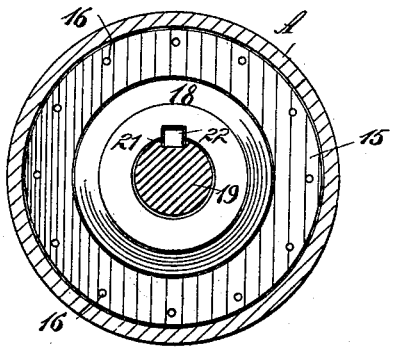
Figure 4:
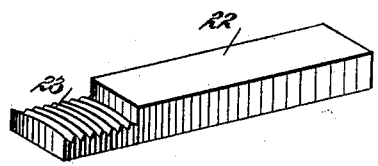

Figure 1 is a longitudinal section through the hub of a bicycle-wheel, illustrating the shaft partly in side elevation and one of the cones in side elevation, the other portion of the shaft and the other cone being in section. Fig. 2 is a transverse section on the line 2 2 of Fig. 1. Fig. 3 is a similar section on the line 3 3 of Fig. 1. Fig. 4 is a detail perspective view of a lock used in connection with a cone. Fig. 5 is a longitudinal section through the hub of the rear wheel of a bicycle, showing the improved bearing applied, the bearing being partially in section. Fig. 6 is a view similar to Fig. 5, except that the bearing is shown as applied to the crank-hanger of a bicycle; and Fig. 7 is a detail view showing the manner in which the driving-sprocket of the crank-shaft is attached to the pedal-arm.

A is a casing representing the shell of a wheel-hub or of a crank-hanger. The said casing or shell is provided with an interior annular recess at each end and an interior thread 10 near the outer end of said recessed or reduced portion. The casing or shell shown in Fig. 1 is illustrated as provided with spoke-flanges 11, fitting the said shell for use as the hub of a bicycle-wheel, the hub shown in Fig. 1 being particularly adapted for the front or steering wheel of the bicycle. A ball-cup B is placed near each end of the hub within the same, the back portion of each cup having bearing against a shoulder formed by recessing the inner portion of the hub, as shown in Fig. 1 and as heretofore set forth.

Each ball-cup consists of a back plate 12, having a central opening and fitted to the interior of the hub, and an outwardly-extending marginal flange 13, which fits in the recessed portion of the hub. The back plate 12 of each cup is provided with a number of openings or apertures 14, located adjacent to where the back plate connects with the flange 13, so that the apertures are brought as closely as possible to the inner wall of the hub. A retaining-ring 15, provided with a series of openings 16, has bearing against the flange 13 of the outer end portion of each ball-cup. Balls 17 are placed in the said cups, having bearing against the back plates and flanges of the cups and against the chamfered surface of a cone 18, one of these cones being located at each end of the hub. A shaft or axle 19 extends through the hub and beyond its outer ends, passing likewise through the central openings in the ball-cups and through corresponding openings in the cones.

The extremities of the shaft or axle 19 are exteriorly threaded, and adjacent to the threaded ends, yet within the hub, longitudinal keyways 21 are made in the said axle or shaft, adapted to receive keys 22, which fit likewise in keyways in the cones. The keys 22, however, extend outward beyond the outer faces of the cones, and the outer ends of the keys are so reduced and arched as to conform to the circular contour of the axle or shaft, being provided with threads 23, forming continuations of the threads 20 on the said axle or shaft. These specific keys form no part of the present invention. A lock-nut 24 is screwed upon each threaded end of the shaft to a bearing against the outer faces of the cones, being likewise screwed over the outer ends of the keys 22, holding the said keys in place. A dust-cap 25 is provided for each end of the hubs, having an opening therein which loosely receives a cone, and each dust-cap is provided with an exteriorly-threaded flange 26, the flanges being so placed that they may be screwed in the ends of the hubs to a bearing against the ball-retaining rings 15, as is also indicated in Fig. 1. A second annular flange 28 is formed upon the inner face of each dust-cap between the outer flange and the opening in the dust-cap through which a cone is to extend, and a peripheral flange 29 is formed upon each cone at such point that the peripheral flange of the cone will extend quite close to the inner end of the inner flange 28 of the dust-cap provided for the cone.

A packing or a washer 30 is located in the space or chamber formed by the two flanges 28 and 29, and the said packing need not necessarily engage with the cone around which it is located, but may be secured to the dust-cap and its flange 28. An oil-cup 31 is placed at the central portion of the hub and the delivery-tube of the oil-cup extends downward within the hub beyond its inner face, so as to prevent the oil fed into the interior of the hub from again returning to the oil-cup.

In the operation of this device the oil from the main chamber of the hub will be fed to the balls 17 through the openings 14 in the ball-cups, and the overplus of oil will find its way through the openings 16 made in the ball-retaining ring. Thus it will be observed that the balls will be supplied with oil from the main chamber of the hub and likewise from the end chambers in the hub, as the oil will seek to find its way back to the said main chamber. The spoke-flanges 11 preferably have bearing directly over the tread of the balls, thus preventing the hub or shell A from being unduly strained.

All cones in general use in the outer ends of hubs are threaded on the axle, and all such cones are ground true by being placed on the axle, and as long as they remain in the position they were in when ground said cones will remain true; but when the cones move to the right or to the left they are drawn out of true, as is evidenced by the wearing of the cones in one spot while the balance of the ball tread remains in good condition. Under the construction shown in the drawings the cones are fitted snugly to the axle, being slipped on, and are prevented from turning on the axle by means of the key 22.

When threading an axle, the key should be placed in its groove in said axle and threaded as far as the shoulder of the key, as illustrated in Fig. 4. When the cone and locking-nut are assembled on the axle, the locking-nut will engage the threaded end of the key, holding it firmly in place as well as the cone itself.

When the parts are assembled and the cone ground to true, it will be utterly impossible for the cone to get out of true, as the adjustment is made by slipping the cone in and out on the axle and not by turning the cone to the right or to the left. The locking-nut need not necessarily be used in connection with the cone when applied to the crank-hanger of a bicycle. The slot 21 is longer than the key 22 in order to allow any adjustment that may be needed.

The cone-flange 29, the retaining-ring 15, the dust-cap flange 28, and the washer or packing 30 form a combination of obstructions that make the entrance of dust absolutely impossible. The flange 28 on the dust-cap also absolutely prevents the escape of oil from the hub even though the wheel should be laid upon its side, as is often done. The washer or packing 30 is preferably cemented to the dust-cap and its flange in such manner as to prevent it coming in contact with the cone; but the washer or packing is fitted as closely as possible to the cone without causing friction.

It will be noticed that the dust-cap next the cone is provided with a rounded surface $31^a$, running to a point flush with the outer end of the cone. The object of this construction is to prevent any lodgment of mud, dust, or water near the opening between the cone and dust-cap. Any foreign matter collecting on the dust-cap will therefore necessarily fall over the opening between the cone and dust-cap and will find lodgment on the lock-nut, where it will remain or will be thrown off by the motion of the wheel.

In Fig. 5 I have illustrated the improved bearing applied to the hub C of the rear wheel of a bicycle, in which the axle C' is made to pass through the rear forks 32 of the bicycle-frame. The bearings are identical with those heretofore described, and shown in Fig. 1; but the hub at one of its ends is provided with an exterior thread 33, and a sprocket-wheel 34 is secured upon the exterior threaded portion of the hub to a bearing against a shoulder 36. The said sprocket-wheel 34, which is the rear sprocket, is provided with a flange 35 at the base of its teeth, the flange being milled to fit the chain, thereby preventing much friction and reducing to a minimum the possibility of the chain slipping as it gradually becomes worn. Before the dust-cap is placed in position on that end of the hub at which the sprocket-wheel is to be located the sprocket-wheel is screwed to place and a locking-ring 37 is screwed on the hub to an engagement with the said sprocket-wheel. A further difference in construction consists in that an adjusting-nut 38 is screwed on the axle or shaft C', located between the forks of the frame and the cones, while a lock-nut 39 is screwed upon the extremities of the axle or shaft, having bearing against the outside faces of said forks.

In Fig. 6 I have illustrated the application of the improved ball-bearings to the crank-hanger D of a bicycle. The crank-axle 40 is made in two sections, one section being provided with a reduced exteriorly-threaded member 41, which is adapted to be screwed into a recess 42, made in the opposing section, the wall of which is threaded, the threads of the two sections being right-hand threads. After the sections of the crank-shaft have been connected a sleeve 43, provided with an interior left-hand thread, is screwed upon the two sections of the shaft at the joint, the sections being provided with a corresponding exterior thread. The specific crank-axle shown in Fig. 6 forms no part of the present invention. Under this construction of crank-shaft said crank-shaft is readily removable from the hanger, and a sectional shaft is provided which when the sections are connected will be as strong as a shaft made in but one piece. The left-hand pedal-arm 44 is attached to the left-hand section of the crank-shaft in any suitable or approved manner, and the left-hand cone is adjusted through the medium of a nut 45, located between the cone and the left-hand pedal-arm 44. In order that the adjusting-nut 45 may be held from turning accidentally, a set-screw 46 is passed through the pedal-arm 44 and into a groove or a series of apertures made in the outer face of the adjusting-nut 45. The right-hand pedal-arm 47 preferably forms an integral portion of the right-hand section of the crank-shaft, and an adjusting-nut 48 is provided for the right-hand cone, located between the said cone and the right-hand pedal-arm. A spider 49 is secured at the left-hand face of the right-hand pedal-arm, the spider being provided with a rim 50, exteriorly threaded, and the said rim has an annular flange 51 formed upon its outer or right-hand side. The driving-sprocket 52 is secured to the said spider, the spokes 52ª of the said sprocket-wheels having recesses made in their inner ends, whereby they will fit over the flange 51 of the spider and engage with the rim of the same, the sprocket-wheel being held firmly upon the spider by a clamping-ring 53, screwed upon the rim to a bearing against the spokes. The driving-sprocket 52 is made in the same manner as the sprocket 34, heretofore described. The sleeve 43 is provided with lugs 54, adapted to receive a spanner passed through an opening 55, formed in the bottom of the crank-hanger and normally closed by a cap 56. The cap being removed, the spanner or other tool is made to engage with the lugs 54, and by turning one of the pedal-arms the sleeve 43 may be screwed over the point of connection of the shaft-sections or may be carried entirely upon one of said sections.

Having thus described my invention, I claim as new and desire to secure by Letters Patent—

1. The combination, with a casing, a ball-cup and a shaft or axle passed through the said ball-cup, of a cone, a key securing the cone on the shaft or axle, an outer end of the shaft being threaded and the outer end of the key reduced and correspondingly threaded to the axle, and a nut located on the threaded portion of the shaft or axle and the threaded portion of the key, for the purpose set forth.

2. The combination, with a shaft or axle having an end threaded, and a cone for the axle or shaft, of a key securing the cone to the axle or shaft, the outer end of the key being threaded correspondingly to the axle and forming a portion of the exterior threaded surface of the axle, for the purpose specified.

3. The combination of a casing, a back plate secured in each end of the casing, each back plate having a marginal flange extending outward from the respective plates, a shaft or axle passed through the casing and through the back plates, a cone secured to each end of the shaft or axle, and coacting with the back plates to form ball-races, each cone having an annular peripheral flange, a dust-cap secured in each end of the casing, the dust-caps respectively encircling the cones and each dust-cap having an inwardly-extending annular flange respectively coacting with the flanges on the ball-cones, a washer encircling each cone, the washers being respectively confined between the members of the two pairs of flanges, and means for securing the cones rigidly to the shaft or axle.

4. The combination of a casing, a back plate secured in each end thereof, a shaft or axle passed through the casing and through the back plates, a ball-cone fixed to each end of the shaft, the ball-cones coacting with the back plates to form ball-races, each cone having an annular peripheral flange, a dust-cap secured in each end of the casing, the dust-caps encircling the ball-cones and having each an inwardly-projected annular flange, a washer fitting between the members of each pair of flanges, a retaining-ring held between each back plate and the adjacent dust-cap, and means for securing the cones on the shaft or axle.

5. The combination of a casing, an axle mounted therein, a ball-cone fixed on the axle and having an annular flange secured thereto, a dust-cap secured in the end of the casing and encircling the ball-cone outside of the flange thereof and having a flange projecting toward the flange of the ball-cone, and a washer encircling the ball-cone and bearing between the two flanges so as to be held thereby.

ARTHUR GORDON HITCHCOCK.

Witnesses:
JOHN B. DIAS,
WM. HAYWOOD.